Figure 1:
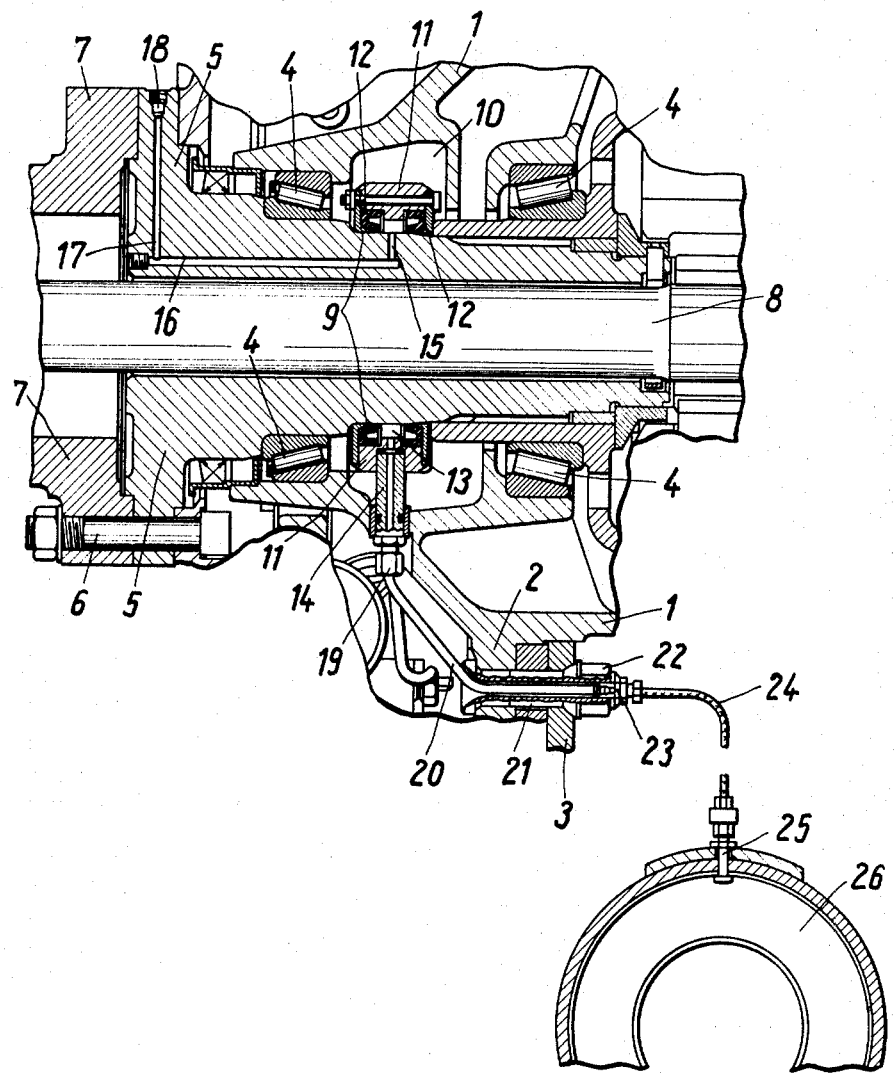

United States Patent
Juttner et al.

[15] 3,705,614
[45] Dec. 12, 1972

[54] TIRE EQUIPPED VEHICLE WHEEL TO BE CONNECTED WITH A TIRE AIR FILLING DEVICE CARRIED BY THE VEHICLE

[72] Inventors: Alwin Juttner, Wiesloch; Hans Gruner, Heidelberg, both of Germany

[73] Assignee: Graubremse GmbH, Heidelberg, Germany

[22] Filed: July 21, 1970

[21] Appl. No.: 56,910

[30] Foreign Application Priority Data

July 28, 1969 Germany...................P 19 38 202.6

[52] U.S. Cl.............................................152/417
[51] Int. Cl.............................................B60c 23/00
[58] Field of Search....................................152/417

[56] References Cited

UNITED STATES PATENTS

| | | | |
|---|---|---|---|
| 2,976,906 | 3/1961 | Kamm et al. | 152/417 |
| 2,931,414 | 4/1960 | Jankowski | 152/417 |
| 3,276,502 | 10/1966 | Ruf | 152/417 |

*Primary Examiner*—James B. Marbert
*Attorney*—Ernest G. Montague

[57] ABSTRACT

A vehicle wheel having air tires to be connected with an air filling device of the vehicle, which comprises a rotating air passage ring disposed centrally to an axle; a tire filling valve is connected with the ring by means of conduits; a wheel hub receives the air passage ring; a guide face of a bearing neck of the axle and of a hub carrier is provided, and an air passage ring is sealingly slidingly mounted on the guide face.

1 Claim, 2 Drawing Figures

TIRE EQUIPPED VEHICLE WHEEL TO BE CONNECTED WITH A TIRE AIR FILLING DEVICE CARRIED BY THE VEHICLE

The present invention relates to an air tired vehicle wheel to be connected with a tire filling device with a rotating passage ring disposed centrally to the axis, also called Rotor, to which a tire filling valve is connected by means of a hose or of conduits. The air feed to the rotor takes place thereby either by conduits passing the axis or tubes or hose conduits surrounding the outer side of the wheel. The different axle constructions do not permit in many cases the application of the air feeding into the vehicle axle, and the guidance of the conduits around the axle is complicated and lending itself to disturbances. In many cases, however, long feeders from the centrally disposed rotor to the tire filling valve is required. Such conduits are not only lending themselves to disturbances, but also prevent a change of tires.

It is one object of the present invention, to provide an air tired vehicle wheel to be connected with a tire filling device which avoids the drawbacks referred to above and to provide an arrangement which is applicable for all axial structures, removes the likelihood of disturbances and does not prevent the change of wheels. This is brought about, in accordance with the present invention such, that the air passage ring is disposed in the wheel hub and it tightly slidingly mounted on the guide face of the bearing neck of the axle. Preferably, is thereby, the air feed to the air passage ring provided in the immovable bearing neck of the axle and the air feed towards the tire is fed through one of the rim securing screws. Suitably, the driver-bolt for the air passage ring formed simultaneously as an air feeder. Likewise also one of the rim securing nuts can be formed simultaneously as connection for the filling conduit leading to the tire.

The wheel change is simplified such, that the filling conduit consists of two parts, and in particular, an immovably disposed part, which passes the rim securing screw and a short filling hose, which leads to the tire filling valve. The particular rim-securing nut and screw, respectively, can have thereby simultaneously a return valve and safety valve, which prevents the air escape during removal of the wheel.

Figure 2:
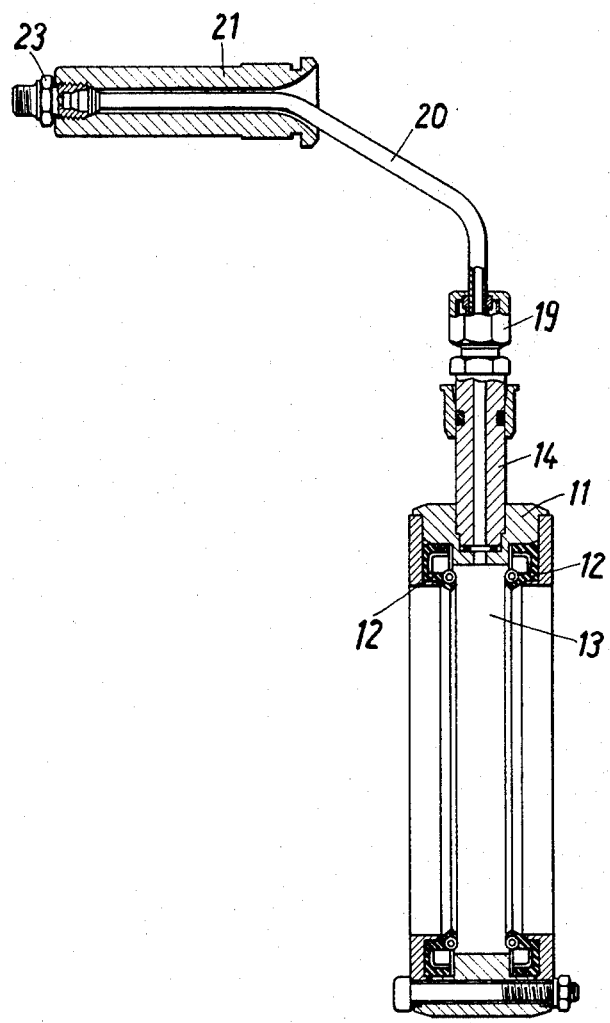

With these and other objects in view, which will become apparent in the following detailed description, the present invention will be clearly understood in connection with the accompanying drawings, in which:

FIG. 1 is an axial section of a wheel hub, which is rotatably mounted on the bearing neck of the axle, which is passed by a plug shaft driving the wheel; and FIG. 2 is a fragmentary section of the air passage ring and the rim-securing screw with the filling conduit projecting through the latter.

Referring now to the drawings, the vehicle wheel includes a wheel hub 1, which is equipped with a collar 2 for securing a wheel rim 3 and is mounted on the hub carrier 5 by means of a roller bearing 4, which in turn is secured on the axle body 7 by means of the securing screws 6. In driven wheels, the drive takes place by the plug shaft 8 projecting through the hub carrier 5 and transmission members (not shown).

In accordance with the present invention, a sliding face 9 is provided inside of the wheel hub 1 on the hub carrier 5, on which sliding face 9 an air passage ring 11 is guided in a recess 10 of the hub. The ring 11 is sealed relative to the sliding face 9 by two simmer rings or the like 12. These sealings 12 limit in the air passage ring 11 a ring chamber 13, to which is connected an air passage tube 14. This tube 14 guides itself tightly in the air passage ring and projects through the inner part of the wheel hub. Simultaneously this tube 14 forms the driver bolt for the air passage ring 11.

Furthermore, bores 15, 16 and 17 are provided in the rigid hub carrier, which are connected together and which forms the air feed to the inner space 13 of the air passage ring 11. The bore 17 leads outwardly and terminates in a branch 18, to which is connected the conduit led from the air feeding device of the vehicle.

A conduit 20 is connected with the air passage 14 by means of a branch screw 19, which passes through one of rimsecuring screws 21 and nuts, respectively. A filling valve 25 for a particular air tire 26 is connected with the conduit 20 by means of a conventional coupling 23, which is therefore not described in detail by means of a connecting hose 24. A safety-on return valve can be built in, if necessary, into the coupling 23, which valve prevents the undesirable air escape upon release of the rim-securing nut 22 for the purpose of changing wheels.

Referring now again to the drawings and in particular to FIG. 2, the air passage ring 11 is shown at an enlarged scale in section jointly with the tube branch 14, which forms simul-taneously the driver bolt for the air passage ring 11.

While we have disclosed one embodiment of the present invention, it is to be understood, that this embodiment is given by example only and not in a limiting sense.

I claim:

1. A vehicle wheel having air tires to be connected with an air filling device provided on the vehicle, comprising a wheel hub carrier, a wheel hub rotatably mounted in said wheel hub carrier, an air passage ring rotating with a tire of the vehicle and disposed in said wheel hub and sealingly slidably rotatingly arranged relative to a guide face on an end of said hub carrier, a tire filling valve, conduits operatively connecting said air passage ring to said tire filling valve, an air feed to said air passage ring exclusively disposed in said hub carrier secured to the vehicle for conducting air to said air passage ring, a hollow driver bolt disposed between said air passage ring and said wheel hub and constituting simultaneously an air channel from said air passage ring, a tube constituting one of said conduits and arranged inwardly on said wheel hub and connected to said driver bolt, rim securing screws, said tube extends through one of said rim securing screws toward an outside direction, and a rim securing nut for said one of said rim securing screws being secured as a connection for another of said conduits constituting a filling feed and leading to said tire filling valve.

* * * * *